United States Patent
Hosking et al.

(10) Patent No.: US 8,880,962 B2
(45) Date of Patent: *Nov. 4, 2014

(54) MAINTENANCE PLANNING AND FAILURE PREDICTION FROM DATA OBSERVED WITHIN A TIME WINDOW

(75) Inventors: Jonathan R. M. Hosking, Scarsdale, NY (US); Emmanuel Yashchin, Yorktown Heights, NY (US); Yada Zhu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/454,743

(22) Filed: Apr. 24, 2012

(65) Prior Publication Data

US 2013/0282355 A1    Oct. 24, 2013

(51) Int. Cl.
*G06F 11/00* (2006.01)
(52) U.S. Cl.
USPC .......................................................... 714/47.3
(58) Field of Classification Search
CPC ........ G06F 11/008; G06F 11/07; G06F 11/00
USPC ...................................................... 714/47.3
See application file for complete search history.

(56) References Cited

U.S. PATENT DOCUMENTS

| 7,072,841 | B1 | 7/2006 | Pednault |
| 7,966,150 | B2 | 6/2011 | Smith et al. |
| 2009/0265449 | A1* | 10/2009 | Krishnappa et al. ........... 709/220 |
| 2010/0076453 | A1* | 3/2010 | Morris et al. .................. 606/130 |
| 2010/0100337 | A1* | 4/2010 | Vichare et al. .................. 702/34 |
| 2011/0029824 | A1 | 2/2011 | Schoeler et al. |
| 2011/0125461 | A1 | 5/2011 | Smith et al. |
| 2011/0283146 | A1* | 11/2011 | Nemecek et al. ............... 714/37 |

OTHER PUBLICATIONS

Wikipedia, "Markov chain Monte Carlo", last modified on Apr. 3, 2012.
Riti, www.riti.com/prodserv_caris.htm, CARIS (Computer Aided Resource Information System), printed on Apr. 23, 2012.
Nexgen, www.nexgenam.com/CMMS-Details.html, "Nexgen Asset Management", printed on Apr. 23, 2012.
Floodstopper by FirstSmart Sensor, www.floodstopper.com, printed on Apr. 23, 2012.
Apte, C., et al., "Probabilistic Estimation Based Data Mining for Discovering Insurance Risks", IBM Research Report RC-21483, Sep. 13, 1999.

(Continued)

*Primary Examiner* — Jigar Patel
(74) *Attorney, Agent, or Firm* — Scully, Scott, Murphy & Presser, P.C.; Daniel P. Morris, Esq.

(57) ABSTRACT

A system, method and computer program product for predicting a failure of equipment from prior maintenance data of the equipment collected during a time duration estimate a number of preceding failures of the equipment prior to the time duration. The system, method and computer program product construct a model, based on the prior maintenance data, of an impact of an external intervention on a failure of the equipment. The system, method and computer program product construct a model, based on the constructed model of the impact of the external intervention and the estimated number of preceding failures, a replacement policy of the equipment and a probability of a subsequent failure of the equipment in a subsequent time period.

20 Claims, 9 Drawing Sheets

(56) References Cited

OTHER PUBLICATIONS

Alvarez, F, "Smoothed nonparametric estimation in window censored semi-Markov processes", Journal of Statistical Planning and Inference 131 (2005) 209-229.

Zuo, J., et al., "Analysis of Window-Observation Recurrence Data", Technometrics, American Statistical Association and the American Society for Quality, May 2008, vol. 50, No. 2.

Kyriakidis, E.G., et al., "Optimal preventive maintenance of a production system with an intermediate buffer", European Journal of Operational Research 168 (2006) 86-99.

Zhao, Y., et al., "Fisher information in window censored renewal process data and its applications", Ann Inst Stat Math (2011) 63:791-825.

Rostum, J. "Statistical Modelling of Pipe Failures in Water Networks", Norwegian University of Science and Technology NTNU, Department of Hydraulic and Environmental Engineering, A Dissertation Submitted to the Faculty of Civil Engineering, the Norwegian University of Science and Technology, in partial fulfilment of the requirements for the degree of Doctor Engineer, Trondheim, Norway, Feb. 2000.

Zhu, Y., et al., "Availability optimization of systems subject to competing risk", European Journal of Operational Research 202 (2010) 781-788.

Kleiner, Y., et al., "Comprehensive review of structural deterioration of water mains: statistical models", Urban Water, Oct. 2001, vol. 3, No. 3, pp. 131-150.

* cited by examiner

500

| EQNUM | PROBLEM CODE | REMEDY | INSTALLDATE | FAILUREDATE | DIAMETER | LENGTH | MATERIAL | PRESSURE ZONE | SOILTYPE | ... |
|---|---|---|---|---|---|---|---|---|---|---|
| 3014193 | LEAK | INSTL CIR CLAMP | 11/27/1923 | 1/9/2003 | 7.2 | 21 | CI | 1ST | U1 | |
| 3014193 | LEAK | REP | 11/27/1923 | 5/15/2004 | 7.2 | 12 | CI | 1ST | U1 | |
| 3014193 | LEAK | PATCHED | 11/27/1923 | 2/4/2009 | 7.2 | 30 | CI | 1ST | U1 | |
| 3015465 | LEAK | PATHED | 7/10/1911 | 12/12/2004 | 5.8 | 15 | CI | LOW | Ge | |
| 3000003 | | | 9/6/1955 | | 12 | 30 | COP | 2ND | U6 | |
| 3016412 | LEAK | REP | 9/17/1907 | 6/22/2009 | 6.6 | 15 | CI | 1ST | Wp | |
| ... | | | | | | | | | | |

| EQNUM | PATTERN |
|---|---|
| 3012193 | F, R, F |
| 3015465 | F |
| 3000003 | NO EVENT |
| 3016412 | R |
| ... | ... |

FIG. 5B

MAINTENANCE PLANNING AND FAILURE PREDICTION FROM DATA OBSERVED WITHIN A TIME WINDOW

BACKGROUND

This disclosure relates generally to a method and systems for planning maintenance of equipment, and particularly to a system and method for predicting a failure of the equipment.

BACKGROUND OF THE INVENTION

Equipment includes, but is not limited to: a water main, a water or gas pipe, a fire hydrant, a tunnel, a bridge, etc. A failure of equipment has an impact on a society. For example, a water main failure in urban distribution networks has its associated social impacts, for example, an unavailability of water supply, water losses, road closure and drinking water contamination. Thus, the equipment failure has been one of the biggest infrastructure problems facing city and municipal authorities and is a major obstacle for sustainable management of urban resources. Traditionally, municipalities take reactive actions in repairing, rehabilitating and replacing deteriorated public facilities.

In the last 5-20 years, with the availability of geographic information systems, e.g., products from CARIS (Computer Aided Resource Information Systems) and computer-based maintenance management systems, e.g., NEXGEN® Asset Management 2011, more and more municipalities have started to collect equipment failure and maintenance records, build models for predicting breakage of equipment, and plan proactive maintenance interventions.

In major U.S. cities, the average service life of the water pipes is typically around 100 years. Failed water pipes are returned to an operation either by a repair or a replacement. Extensive information on water pipes, for example, diameter, material, failure times and causes, and maintenance actions, has been maintained in a database since 2003. In 2010, cities started using this data to estimate the mean residual life of each equipment for preventive replacement and planning purposes. A length (e.g., 8 years) of an observation window (i.e., time duration during which maintenance actions on equipment are recorded in a database) is short compared to the average service life of water pipes. Information on failures that occur before the start of the observation windows is typically not available. Traditional replacement policy associated with equipment includes, for example, (1) replacing the equipment every ten years; (2) replacing the equipment when a total cost spent to repair that equipment becomes more than a certain value; and (3) replacing every time there is a failure.

SUMMARY

A system, method and computer program product for predicting, from prior maintenance data of the equipment collected during time duration, a failure of equipment in a subsequent time period are provided.

The system, method and computer program product estimate a number of preceding failures of equipment prior to a time duration. The system, method and computer program product construct a model, based on the maintenance data, of an impact of an external intervention on a failure of the equipment. The system, method and computer program product constructs a further model, based on the constructed model of the impact of the external intervention and the estimated number of the preceding failures, of a replacement policy of the equipment and a probability of a subsequent failure of the equipment in a subsequent time period.

The estimation of the number of failures of the equipment includes: deriving a distribution of a time to a first failure in the time duration and deriving a distribution of a time between two consecutive failures of the equipment.

The constructed model of the impact of the external intervention includes: calculating an efficiency of the external intervention.

The system, method and computer program product calculates a probability that no failure of the equipment occurs during the time duration, a probability that exactly one failure of the equipment but no replacement of the equipment occurs during the time duration, a probability that there is only one failure of the equipment followed by a replacement of the equipment, and a probability that there are multiple failures and replacements of the equipment.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIGS. 5A-5B depict tables that illustrate prior maintenance history of equipment;

DETAILED DESCRIPTION

Figure 1:
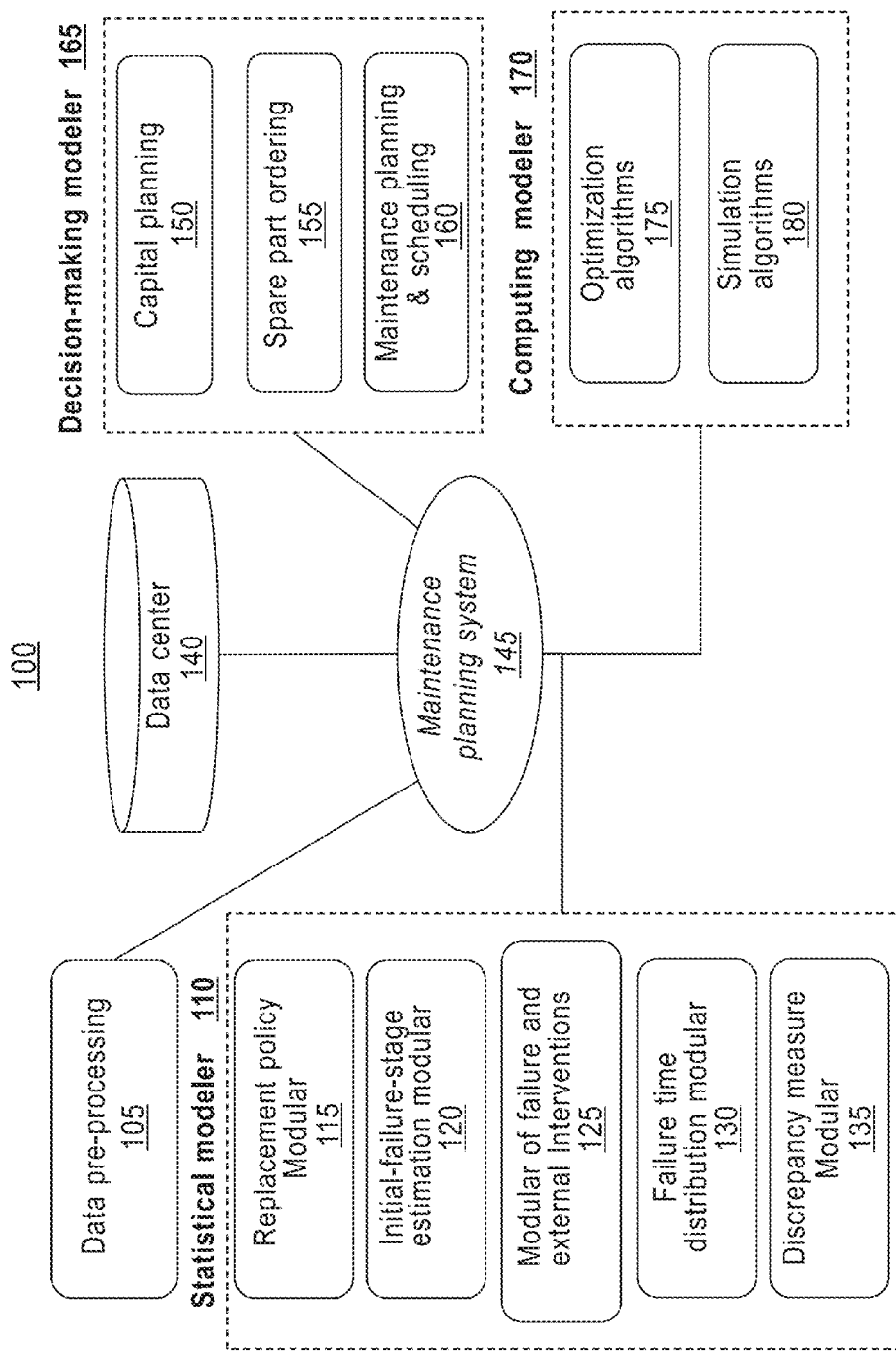
FIG. 1 depicts a system diagram that illustrates a system for predicting a probability of a failure of equipment at a particular time in one embodiment.

Traditional systems for maintenance of equipment are not able to take into account the effect of a maintenance policy on a failure behavior of equipment. The traditional systems do not differentiate initial conditions of components. Traditional systems treat components present at the start point of the observation window as new components. Traditional systems do not take into account observation windows that do not include any failure or replacement of equipment. Traditional systems depend on restrictive assumption, e.g., failures of the equipment would be uniformly distributed during the observation window, which is not valid in practice.

External intervention, e.g., maintenance of equipment, a repair of that equipment, a replacement of the equipment, an inspection of that equipment, can impact a failure behavior of the equipment. Repair can either increase or decrease a probability that the equipment will fail in the near future, e.g., in the next 5 years. Repair can impact the probability that the equipment needs to be replaced in the near future: a component that had a particular number of repairs is generally more likely to be replaced at a next failure than a similar component with a smaller number of repairs. Replacement of a component resets a failure process, i.e., the component has no history of failures. Practical concerns and constraints, e.g., whether a component needed to repair the equipment will be available two months later, future operating cost, replacement cost and damage cost incurred by equipment failure, can lead to a complicated maintenance policy in terms of repairs and replacements. Regarding an individual component of equipment, the number of failures followed by repairs prior to a replacement of the component can vary, i.e., be random, over a time horizon. This varying number of failures prior to the replacement can lead to complexity in estimating the failure probability of the equipment. Renewal, i.e., resetting the prior number of failures to zero, or Poisson assumption, i.e., that failures of the equipment would be uniformly distributed during the observation window, do not reflect a real situation in practice.

A failure, repair and replacement of equipment involve recurrent events. Frequently, available data, which records prior maintenance history of equipment, is window-censored: only events that occurred during a particular time interval are recorded, e.g., in a database. Window censoring presents a challenge for infrastructure failure analysis. For a statistical inference from window censored recurrence data, i.e., prior maintenance data collected during time duration, a likelihood function for modeling the statistical inference can be derived. The likelihood function can be derived in which probability distributions of inter-recurrence intervals in a single path need not be identical and may be associated with covariate information. In other words, a failure time distribution of a water pipe with one, two or three previous number of failures may not be identical; and can be different due to number of previous number of repairs, diameter, length, material, etc. there may be independence among different sample paths, i.e., maintenance of one item of equipment does not affect maintenance of another item of equipment. An item of equipment refers to an equipment unit, e.g., a fire hydrant, a boiler, etc. In one embodiment, a distribution to model the effect of external interventions on recurrence processes is derived as described below in detail. This distribution represents that the probability of a replacement of equipment increases with the number of historical interventions. For example, an item that had a given number of repairs is generally more likely to be replaced upon a subsequent failure than a similar item with a smaller number of repairs.

In one embodiment, as described in detail below, a mathematical model can represent a replacement policy in terms of K, i.e., the number of failures of equipment. In addition, a mathematical model and its likelihood function can be used to jointly estimate parameters of the model, which are related to both the distribution of K and the distributions of inter-recurrence intervals. An inter-recurrence interval refers to a time interval between two different failures. The likelihood function may represent that the distributions of inter-recurrence intervals are not necessarily identical and can depend on covariate information associated with a component or its history.

Figure 2:
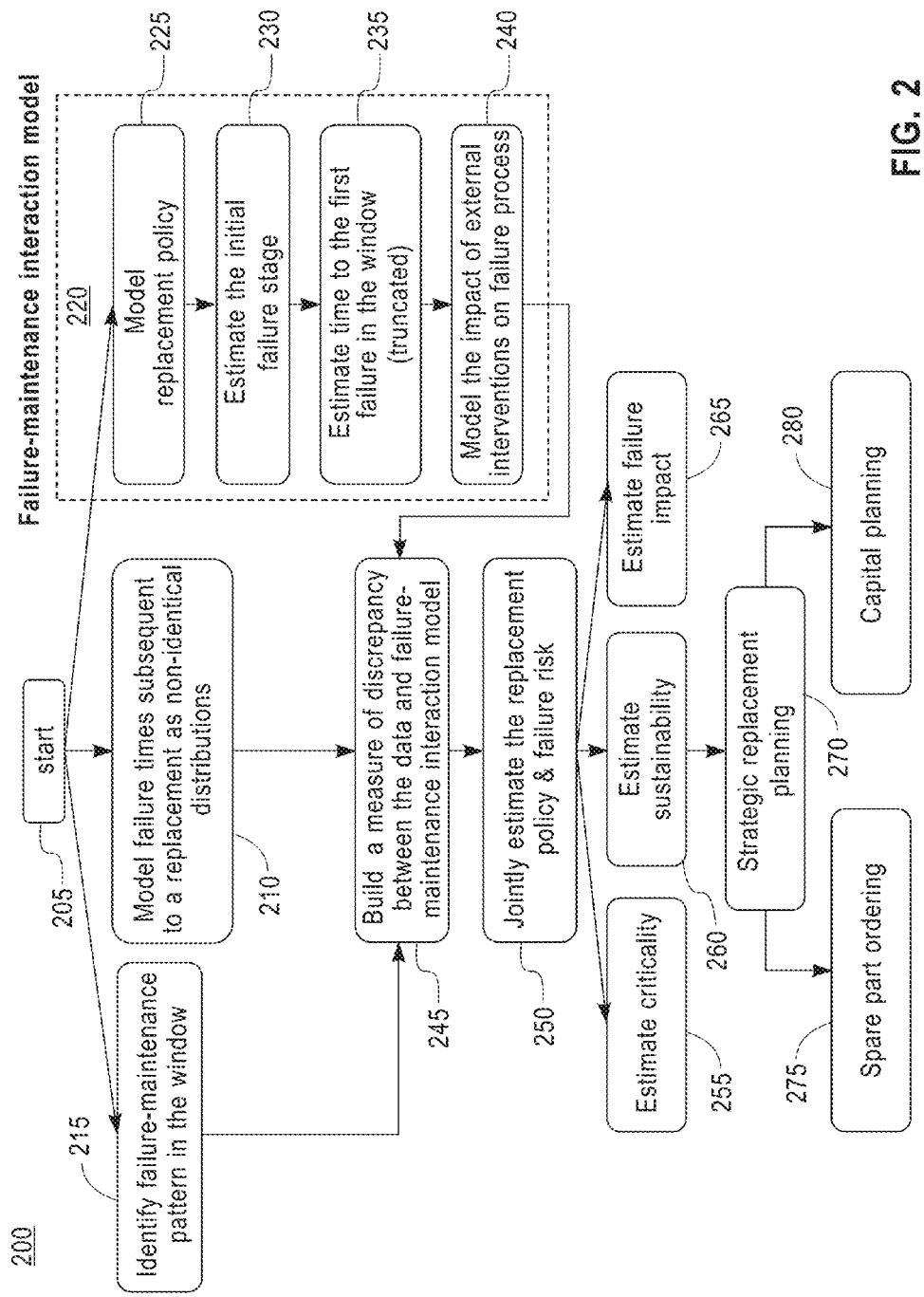
FIG. 2 depicts a flow chart that illustrates method steps for predicting a probability of a failure of equipment at a particular time in one embodiment.

FIG. 1 depicts a system diagram that illustrates a system 100 for predicting a subsequent failure of equipment from prior maintenance data of that equipment collected during a time duration, e.g., an observation window. FIG. 2 depicts a flow chart 200 that illustrates method steps for predicting a subsequent failure of equipment from prior maintenance data of that equipment collected during a time duration. In one embodiment, the collected prior maintenance data comes from a plurality of resources, e.g., water pipe failure and maintenance data of a region, e.g., sub-urban, rural, or urban areas, e.g., a city, e.g., Washington D.C. The prior maintenance data collected from each different resource may have a different time duration for which the prior maintenance data was collected. As shown in FIG. 1, the system 100 includes, but is not limited to: a data processing device, e.g., a preprocessor 105, a database 140, e.g., IBM® DB2, etc., a maintenance planning system 145, a statistical modeler 110, a decision-making modeler 165, and a computing modeler 170. As shown in FIG. 1, the statistical modeler 110 includes, but is not limited to, the following functional components embodied as programmed instructions in a computer system memory: a replacement policy module 115, an initial-failure-stage estimation module 120, a failure and external intervention module 125, a failure time distribution module 130, and a discrepancy measure module 135. As shown in FIG. 1, the decision-making modeler 165 includes, but is not limited to, the following functional components embodied as programmed instructions in a computer system memory: a capital planning module 150, a spare part ordering module 155, and a maintenance planning and scheduling module 160. As shown in FIG. 1, the computing modeler 170 includes, but is not limited to, the following functional components embodied as programmed instructions in a computer system memory: an optimization module 175 and a simulation module 180.

Figure 9:
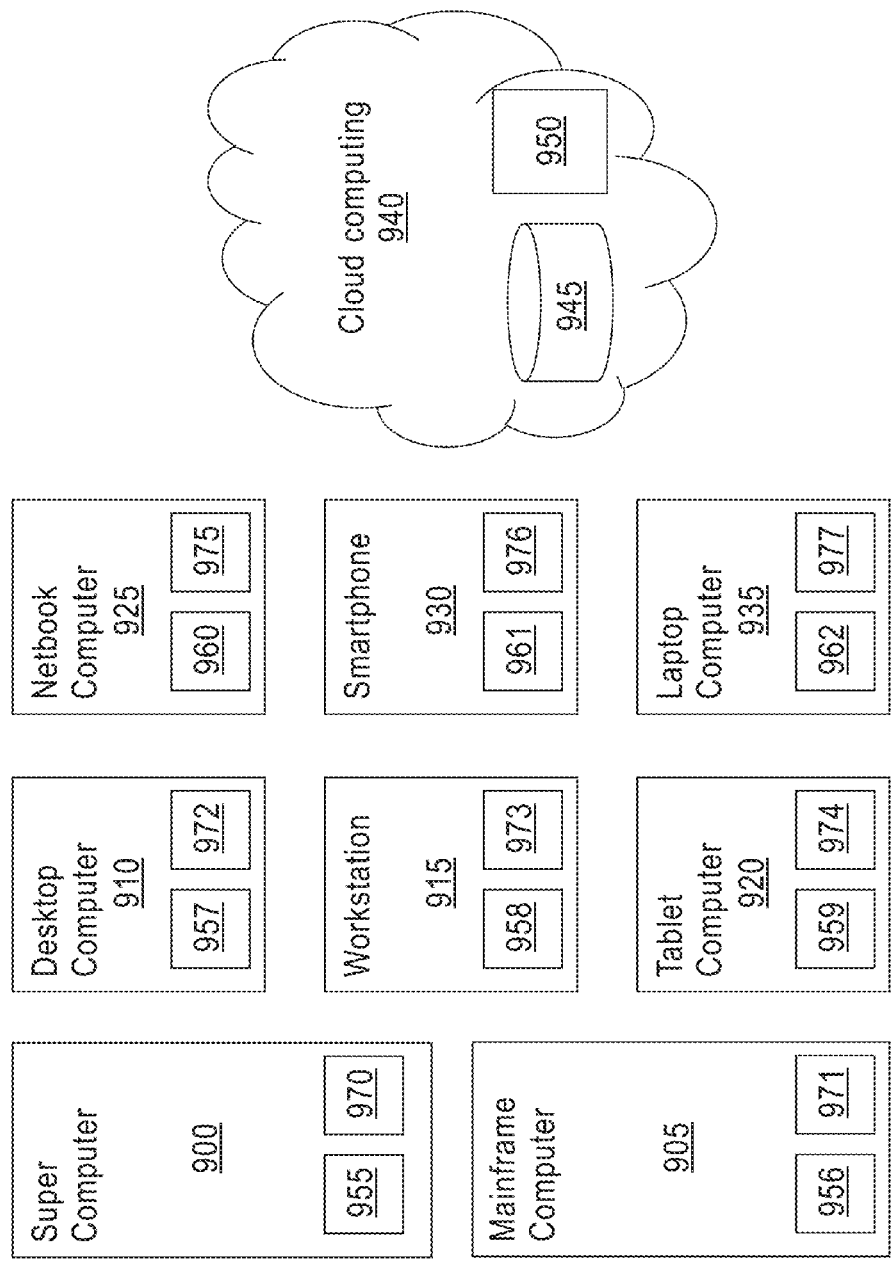
FIG. 9 depicts an exemplary hardware configuration of a maintenance planning system that runs method steps in FIG. 2.

In one embodiment, as shown in FIG. 9, the maintenance planning system 145 is implemented by a computing system, e.g., a supercomputer 900 (for example, IBM® Blue Gene®, etc.) including at least one processor 955 and at least one memory device 970, a mainframe computer 905 including at least one processor 956 and at least one memory device 971, a desktop computer 910 including at least one processor 957 and at least one memory device 972, a workstation 915 including at least one processor 958 and at least one memory device 973, a tablet computer 920 including at least one processor 956 and at least one memory device 974, a netbook computer 925 including at least one processor 960 and at least one memory device 975, a smartphone 930 including at least one processor 961 and at least one memory device 976, a laptop computer 935 including at least one processor 962 and at least one memory device 977, or cloud computing device 940 including at least one storage device 945 and at least one server device 950.

The FIG. 2 depicts a flow chart 200 that illustrates method steps for predicting a probability of a subsequent failure of equipment in a subsequent time period. At step 205 in FIG. 2, the maintenance planning system 145 starts to operate. The maintenance planning system 145 accesses the database 140 to retrieve prior maintenance history data, e.g., tables 500 and 570 shown in FIGS. 5A-5B. The table 500 shown in FIG. 5A includes, but is not limited to: a column 505 describing equipment identification numbers corresponding to associated equipment; a column 510 describing problems associated with equipment, e.g., a leak in a water pipe; a column 515 describing remedies to the problems; a column 520 describing installation dates of the equipment; a column 525 describing failure dates of the equipments; a column 530 describing diameters of the equipment; a column 535 describing lengths of the equipments; a column 540 describing materials of the equipment; a column 545 describing pressure zones associated with the equipment; a column 550 describing soil types near the equipment. The table 500 may further include a column (not shown) indicating locations of the equipment. In one embodiment, a location of equipment is determined manually, e.g., by an engineer or technician repairing or replacing the equipment. Then, information associated with the location of equipment is entered into the table 500, e.g., by using SQL or Microsoft® Excel spread sheet, etc. In one embodiment, equipment may include a smart sensor (e.g., a wireless electronic sensor used with FloodStopper™ System, etc.) that detects water or gas leak in that equipment, e.g., a pipe. The table 500 may further include a column (not shown) indicating priorities of the equipment. A priority of an item of equipment may be determined based on an estimated number of people potentially affected by that item of equipment. The table 500 may further include a column describing cost of new equipment. A cost of new equipment may be available, for example, from a web site of a hardware store, e.g., Home Depot.

Returning to FIG. 2, at step 215, the maintenance planning system 145 invokes a pre-processor module 105 in order to identify a failure and maintenance pattern of equipment from the retrieved prior maintenance history data. For example, the pre-processor module 105 identifies the failure and maintenance pattern, e.g., as shown in table 570 shown in FIG. 5B. The table 570 shown in FIG. 5B includes, but is not limited to: a column 575 describing identification numbers of items of the equipment; a column 580 describing failure patterns of the equipment, for example, "F" stands for a failure and "R" stands for a replacement and "NO EVENT" stands for that no failure has been occurred. From the table 570, the pre-processor module 105 may identify that equipment item 585 had a failure followed by a replacement followed by another failure.

At step 210 in FIG. 2, the failure time distribution module 130 models inter-failure times, i.e., the time periods between failures, subsequent to a replacement of the equipment for which the failure and maintenance pattern was identified at step 215. The failure time distribution module 130 models a distribution of time periods between two consecutive failures as a failure time distribution.

Thus, an example supposes that a new item of equipment, e.g., a new fire hydrant, is placed in operation at time zero; it fails at time $T_1$ and is immediately repaired and returned to operation; then it fails at time $T_2$, and so on. The equipment item is replaced at its $K_{th}$ failure where K is a positive integer random variable. The new equipment item follows a pattern of failure-with-repair, i.e., a failure followed by a repair, or failure-with-replacement, i.e., a failure followed by a replacement.

Successive inter-failure times, i.e., time periods between consecutive failures, are independent of each other, and the decision to replace a component of equipment or the equipment itself is independent of the failure time, i.e., the time period between two consecutive failures. This recurrence process might start a long time ago, e.g., 50 years ago, and has reached a steady state prior to the observation window. The recurrent process is then monitored during the observed window, and continues past the observation window. Under steady state conditions, the probability of failure within an observation window depends exclusively on the window length.

Let $T_k - T_{k-1}$ denote a functional time, i.e., a time that a component of equipment or the equipment itself is in operation, between the (k−1)th and kth failures, and let $f_k(\cdot)$ and $F_k(\cdot)$ denote the probability density function (pdf) and cumulative distribution function (cdf) of $(T_k - T_{k-1})$, respectively. Different $f_k(\cdot)$s represent the impact of preceding repairs on the time to the next failure, i.e., they govern the increase or reduction in the frequency of failure. For example, as there are more preceding failures during an observation window, the time to the next failure may be reduced and a probability of a replacement at the next failure may be increased. Lengths of the inter-recurrence intervals of the recurrent process are represented by the functional times.

Figure 6:
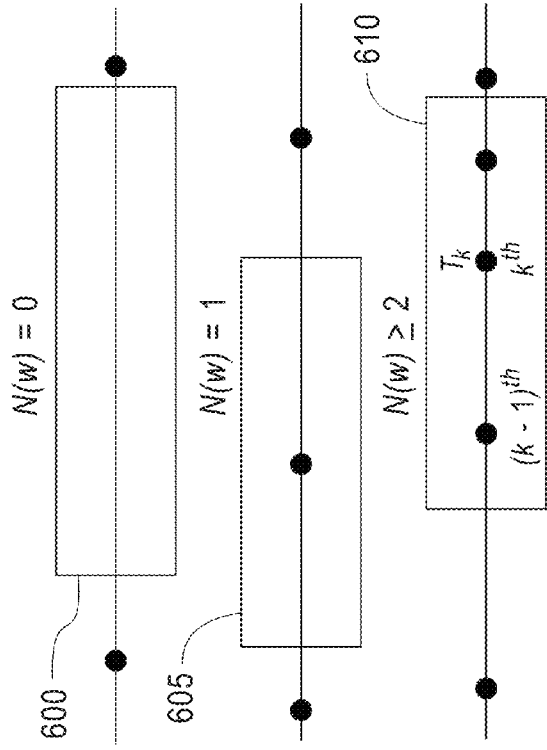
FIG. 6 depicts window censoring scenarios.

Suppose that an observation window is picked by randomly (in particular, independently of the failure times) choosing a point that is uniformly distributed in a time horizon of the recurrence process of failures. Then, from the chosen point, monitoring and recording the failures, e.g., by the maintenance planning system 145, starts and continues for a finite period of time w. In the observation window, there may be no failure events, or one or multiple failure. FIG. 6 depicts three kinds of scenarios of an observation window: (1) an observation window 600 during which no failure of corresponding equipment occurs; (2) an observation window 605 during which one failure of the equipment occurs; and (3) an observation window 610 during which multiple failures occur. In FIG. 6, N(w) denotes the number of failures of the equipment recorded in the observed window.

As shown in FIG. 6, there can be three scenarios in the observation window: no failure event, exactly one failure event, and at least two failure events. The probability that there is no failure in the observation window is given by equation (1):

$$Pr\{N(w) = 0\} = \sum_{k=1}^{m} Pr\{N(w) = 0 \mid I = k\}Pr\{I = k\} \quad (1)$$

$$= \sum_{k=1}^{m} \int_{0}^{\infty} Pr\{N(w) = 0 \mid S = s, I = k\}v(s \mid I = k)ds \cdot$$

$$Pr\{I = k\}$$

$$= \sum_{k=1}^{m} \int_{0}^{\infty} \max\left(0, \frac{s-w}{s}\right)\frac{sf_k(s)}{\mu_k}ds \cdot \frac{q_k \mu_k}{\sum_{j=1}^{m} q_j \mu_j}$$

$$= \sum_{k=1}^{m} \frac{q_k}{\sum_{j=1}^{m} q_j \mu_j} \int_{w}^{\infty} \{1 - F_k(s)\}ds.$$

In equation (1), k is the number of failures with repairs prior to a replacement, w is an observation window length, $\mu_k$ is given by equation (15) below, $q_k$ is given by equation (13) below, $f_k(\cdot)$ is a probability density function of the $k_{th}$ functional times, $F_k(\cdot)$ is a cumulative distribution function of the $k_{th}$ functional times, m is the maximum number of failures of the equipment, j is an index, s is an inter-recurrence interval length between two consecutive failures of the equipment. I denotes a random variable that represents the index of the recurrence interval (i.e., functional time) that the observation window start point lands on.

If there is only one failure in the window, and this failure occurs during the time interval $[t_1, t_1 + \delta t]$, then the observation window length must be no shorter than $t_1$. Let R and F denote failure events with and without replacement, respectively, and let J be an indicator function given by equation (2):

$$J[s \geq t_1] = \begin{cases} 1 & \text{if } s \geq t_1, \\ 0 & \text{otherwise.} \end{cases} \quad (2)$$

The probability that in the observation window there is exactly one failure, without replacement and during the time interval $[t_1, t_1 + \delta t]$, is given by equation (3):

$$Pr\{\Phi\} = \sum_{k=1}^{m-1} Pr\{\Phi \in [t_1, t_1 + \delta t] \mid I = k\}Pr\{I = k\} \quad (3)$$

$$= \sum_{k=1}^{m-1} \int_{0}^{\infty} \frac{sf_k(s)}{\mu_k}J[s \geq t_1]\frac{\delta t}{s}ds(1 - r_k)\{1 - F_{k+1}(w - t_1)\} \cdot$$

-continued $$= \sum_{k=1}^{m-1} \frac{q_k}{\sum_{j=1}^{m} q_j \mu_j} \{1 - F_k(t_1)\}(1 - r_k)\{1 - F_{k+1}(w - t_1)\} \delta t.$$

where $r_k = p_k/(1 - \sum_{j=1}^{k-1} p_j)$ in which $p_k$ is defined by equation (11) below, and $\delta$ is a time interval.

If the only failure is followed by a replacement, then the corresponding probability is given by equation (4):

$$Pr\{\mathfrak{R}\} = \sum_{k=1}^{m} \frac{q_k}{\sum_{j=1}^{m} q_j \mu_j} \{1 - F_k(t_1)\} r_k \{1 - F_1(w - t_1)\} \delta t. \quad (4)$$

The likelihood function for a general pattern of failures can be derived as described below. A likelihood function is a function of parameters of a statistical model, defined as follows: the likelihood of a set of parameter values given some observed outcomes is equal to the probability of those observed outcomes given those parameter values. Let d denote a data set observed within the observation window, and θ a vector of unknown parameters related to the functional time distribution $f_k(\bullet)$ and the distribution of the number of failures before a replacement.

Suppose that there are $N(w) = n \geq 1$ failures at times $t_1, \ldots, t_n$ with the first replacement (if any) at $t_{j_\mathfrak{R}}$. Then the likelihood function is given by equation (5):

$$L(\theta; d, w) = \qquad (5)$$

$$\begin{cases} \sum_{i=1}^{m-n} \frac{q_i}{\sum_{j=1}^{m} q_j \mu_j} \prod_{j=1}^{n+1} L_{j,i+j-1} & \text{if there is no replacement,} \\ \sum_{i=1}^{m-j_\mathfrak{R}+1} \frac{q_i}{\sum_{j=1}^{m} q_j \mu_j} \prod_{j=1}^{j_\mathfrak{R}} L_{j,i+j-1} \prod_{j=j_\mathfrak{R}+1}^{n+1} L_{j,k_j} & \text{if there is at least one replacement} \end{cases}$$

Here $k_j$ for $j > j_\mathfrak{R}$ is the index of the inter-recurrence interval associated with failures at $t_j$, and $L_{j,k}$, the likelihood function of the jth failure where the interval has index k, is given by equations (6)-(8).

$$L_{1,k} = \begin{cases} \{1 - F_k(t_1)\}(1 - r_k) & \text{if a repair is made at the first failure,} \\ \{1 - F_k(t_1)\} r_k & \text{if the equipment is replaced at } \textit{the first} \text{ failure,} \end{cases} \quad (6)$$

$$L_{j,k} = \qquad (7)$$

$$\begin{cases} f_k(t_j - t_{j-1})(1 - r_k) & \text{if a repair is made at the } \textit{jth} \text{ failure, } 1 < j \leq n, \\ f_k(t_j - t_{j-1}) r_k & \text{if the equipment is replaced at the } \textit{jth} \text{ failure, } 1 < j \leq n, \end{cases}$$

$$L_{n+1,k} = 1 - F_k(w - t_n). \quad (8)$$

Equation (6) is the likelihood function of the first failure. Equation (7) is the likelihood function of the second and subsequent failures within an observation window. Equation (8) is likelihood function during the final right-censored inter-recurrence interval. The final right-censored inter-recurrent interval refers to an interval between the last failure within an observation window and the end of the observation window. If there is no failure in the observation window, the likelihood is given by equation (1).

Suppose there are M independent sample paths subject to the same recurrence process. The joint likelihood function of the entire data set is given by equation (9):

$$L(\theta; \bar{d}) = \prod_{s=1}^{M} L(\theta; d_s, w_s), \quad (9)$$

and the log-likelihood function is equation (10):

$$l(\theta; \bar{d}) = \sum_{s=1}^{M} \log[L(\theta; d_s, w_s)], \quad (10)$$

where d represents the total data set collected during the observation window. Given the distributions $f_k(\bullet)$ of functional times and the distribution of $p_k$, estimated values of parameters can be obtained by maximizing equation (10) with respect to unknown parameter vector θ, e.g., by using maximum likelihood estimation method (MLE)—a method for estimating of values of parameters of a statistical model.

Figure 8:
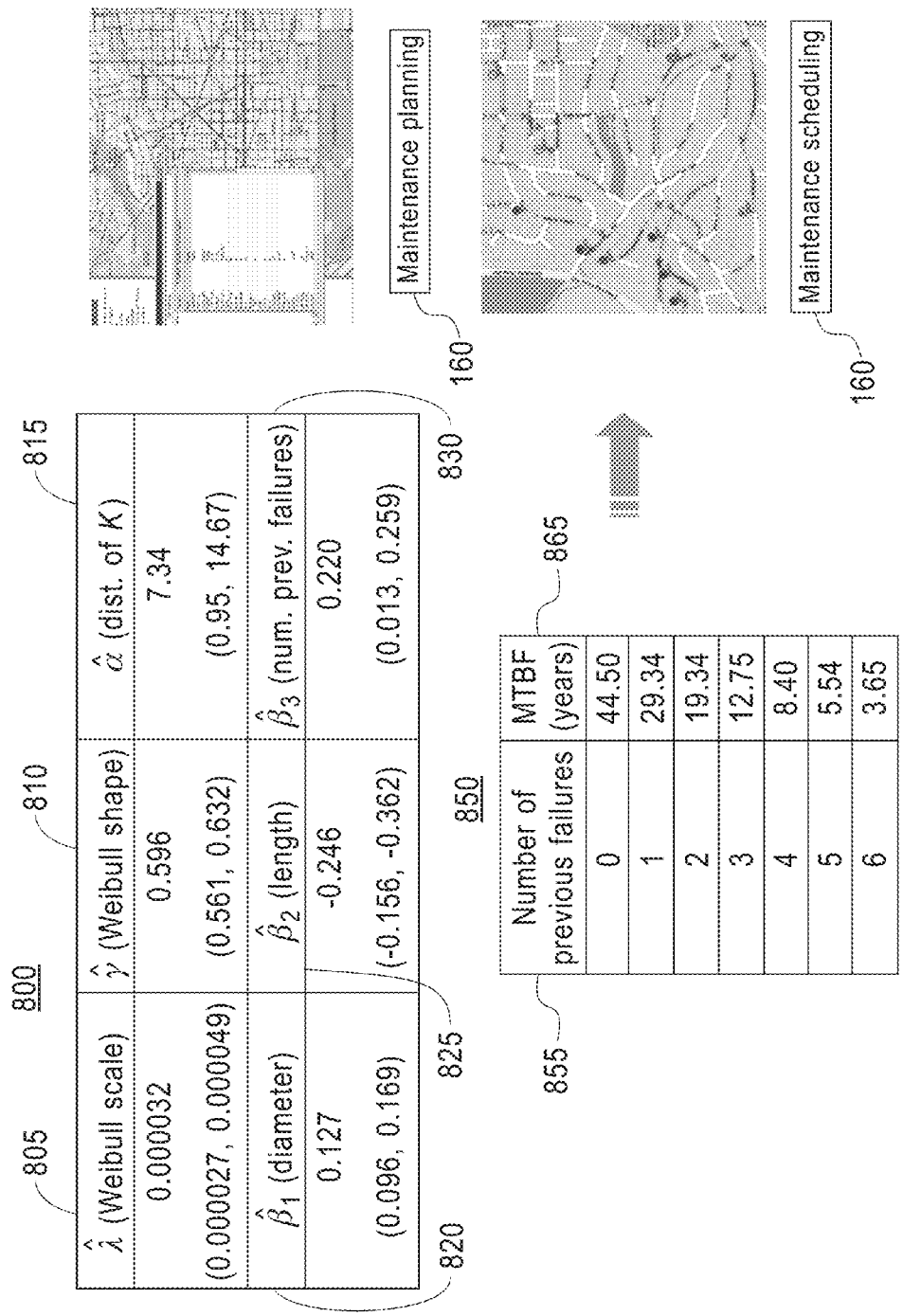
FIG. 8 depicts exemplary parameter estimations.

FIG. 8 depicts exemplary parameter estimations obtained by maximizing equation (10) with respect to θ. In FIG. 8, an exemplary table 800 illustrates six exemplary parameters whose values are estimated from the equation (10). These estimated parameter values are used to calculate a probability of a subsequent failure of equipment in a subsequent time period in view of preceding repairs, e.g., by calculating equations (20) and (21) described below. Although the table 800 illustrates six exemplary parameter estimations, other parameters may be estimated, e.g., by using equation (10) and maximum likelihood estimation. As shown in the table 800, the first estimated parameter 805, $\hat{\lambda}$ represents Weibull scale parameter, which can replace λ in equations (20)-(21). The second estimated parameter 810, $\hat{\gamma}$ represents Weibull shape parameter, which can replace γ in equations (20)-(21). The third estimated parameter 815 α represents parameter of the distribution of K, as in equation (11). The fourth estimated parameter 820 $\widehat{\beta_1}$ represents a diameter of corresponding equipment, which can represent β in equations (20)-(21). The fifth estimated parameter 825 $\widehat{\beta_2}$ represents a length of corresponding equipment, which can represent β in equations (20)-(21). The sixth estimated parameter 830 $\widehat{\beta_3}$ represents the number of previous failures of corresponding equipment, which can represent β in equations (20)-(21). The scale parameter 1/λ of the Weibull distribution is in units of time, e.g., days. In the exemplary table 800 in FIG. 8, the estimated value $\widehat{\beta_3}$ is very small, e.g., 0.000032. They $\hat{\gamma}$ value is less than 1, so the hazard rate (i.e., rate of occurrence of failures) of the functional time distribution is decreasing. The $\hat{\alpha}$ value shows, in the exemplary table 800 of FIG. 8, that a failed pipe reinstalled after a repair has 7 times higher probability to be replaced upon the next failure. The $\hat{\beta}$ values correspond to the standardized covariate values, and the exemplary table 800 of FIG. 8 indicates that pipe length and the number of previous failures have more impact on the pipe failure than the pipe diameter has. The maintenance planning system 145 computes bootstrapped MLEs (maximum likelihood maximization—method for estimating values of parameters in a statistical model) and 95% confidence intervals for all the parameters, as shown in the exemplary table 800 in FIG. 8.

Another exemplary table 850 in FIG. 8 illustrates the estimation of the probability of a failure of an item of equipment for particular values of the covariate, e.g., $x_{a,j,k}$ in equations (20)-(21). Covariate $x_{a,j,k}$ represents the number of previous failures of equipment without a replacement of that equipment. Table 850 includes, but is not limited to: a column 855 of a covariate that represents the number of previous failures and a column 865 of a failure parameter, e.g., mean time between failures (MTBF), i.e., average elapsed time between two failures. Based on the estimated values of the parameters, the maintenance planning system 145 can estimate the failure parameter, e.g., mean time between failures (MTBF). The maintenance planning system 145 can estimate its mean time to the next failure, i.e., an average time period until a next failure, as shown in the table 850 in FIG. 8. If the maintenance planning system 145 sets m=7, i.e., the maximum number of previous failures is seven, the maintenance planning system 145 can estimate the MTBF for k=0, . . . , 6. The estimated MTBF decreases with the increase of the number of previous failures.

With these estimated parameter values, the maintenance planning system 145 solves equations (20)-(21), which calculates a probability of a subsequent failure of equipment in a subsequent time period, e.g., next one year time period. Based on this probability of a subsequent failure of the equipment in a subsequent time period, the maintenance planning and scheduling module 160 schedules an external intervention on that equipment at a specific time. An external intervention includes, but is not limited to: a maintenance of the equipment, an inspection of that equipment, a repair of the equipment, and/or a replacement of the equipment, or combinations thereof. For example, if a probability of a subsequent failure of equipment in a next year is higher than a threshold, e.g., 0.5, the maintenance planning and scheduling module 160 schedules an inspection of that equipment on a certain date within the next year.

Returning to FIG. 2, at step 225, the replacement policy module 115 models a replacement policy in terms of the number of failures with repairs from the prior maintenance data collected from an observation window. In one embodiment, the replacement policy module 115 models the replacement policy as a parametric distribution, e.g., normal, lognormal, exponential or Weibull distribution. In one embodiment, in order to model the replacement policy, the replacement policy module 115 calculates a first probability that when the equipment is replaced, the equipment experienced exactly k number of external interventions. The replacement policy module 115 calculates a second probability that the equipment is deemed to be in need of replacement at kth failure. In order to calculate the first and second probabilities, the replacement policy module 115 performs a maximum likelihood estimation, penalized maximum likelihood estimation, EM (Expectation and Maximization) algorithm or simulation on the prior maintenance data collected during the observation window. In one embodiment, modeling of the replacement policy is based on the number or pattern of repairs prior to a replacement of the equipment.

The number of repairs experienced by equipment until its replacement need not be a fixed number. Currently, the maintenance decision regarding a repair or a replacement is based on experience of engineers or technicians associated with equipment maintenances. Therefore, the maintenance planning system 145 derives a replacement policy using repair-replacement patterns presented in the prior maintenance data collected during an observation window. First, there is specified a distribution for K, the number of failures before replacement, and its parameter values are estimated from the prior maintenance data collected from the observation window. One way to define this distribution is by specifying $p_k = \Pr\{K=k\}$, the probability that when equipment or a component of the equipment is replaced, it has failed exactly k times. A related quantity is $r_k = \Pr\{K=k|K \geq k\}$, the probability of a replacement at the kth failure. $r_k$ is an increasing function of k. $r_k = p_k/(1-\rho_{j=1}^{k-1} p_j)$ and $p_k = r_k \Pi_{j=1}^{k-1}(1-r_j)$.

There are many plausible forms for the distribution of K. In one embodiment, equation (11):

$$p_k = Pr\{K = k\} = \frac{a^{k-1}}{\sum_{j=0}^{m-1} a^j}, \qquad (11)$$

$$a > 0, k = 1, \ldots, m,$$

where m is the upper bound for k and is assumed to be known based on an operational practice, and a is a distribution of the number of failures in an observation window.

Returning to FIG. 2, at step 230, the initial-failure-stage estimation module 120 estimates the number of preceding failures of the equipment prior to an observation window. For example, the probability that there are k−1 number of failures prior to an observation window is given by equation (12):

$$Pr\{I = k\} = \frac{q_k \mu_k}{\sum_{j=1}^{m} q_j \mu_j}. \qquad (12)$$

In equation (12), $q_k$ denote a steady-state proportion of the kth inter-recurrence intervals. Inter-recurrence interval refers to a time period between two different failures within an observation window. Since the kth inter-recurrence interval occurs when there are at least k failures before replacement, the maintenance planning system 145 derives $q_k$ by equation (13):

$$q_k = \frac{Pr\{K \geq k\}}{EK} = \frac{\sum_{j=k}^{m} p_j}{\sum_{j=1}^{m} jp_j} = \frac{\prod_{j=1}^{k-1}(1-r_j)}{EK}, \qquad (13)$$

where $p_k$ is the probability that there are exactly k failures before a replacement and $r_k$ is the probability of replacement at the kth failure. Equation (13) applies to a general distribution $\{p_k\}$. $p_k$ is given by equation (11) above. EK is the expectation of the number of failures before a replacement and given by equation (14):

$$EK = \begin{cases} \frac{1}{1-a} - \frac{ma^m}{1-a^m}, & a \neq 1, \\ \frac{1+m}{2}, & a = 1, \end{cases} \quad (14)$$

Let I be a random variable representing an index of a recurrence interval that includes a start point of an observation window. The probability that this index is k can be derived from formulas for length-biased sampling in $f_k(\cdot)$. The length-biased sampling refers to that a probability that an interval can be selected is proportional to its length. Given equation (13) above, the proportion of time occupied by kth inter-recurrence interval is $Q_k = q_k \mu_k / \Sigma_{j=1}^m q_j \mu_j$ where $\mu_k$ is a mean length of the kth recurrence interval and is given by equation (15):

$$\mu_k = \int_0^\infty s f_k(s) ds \quad (15)$$

Figure 7:
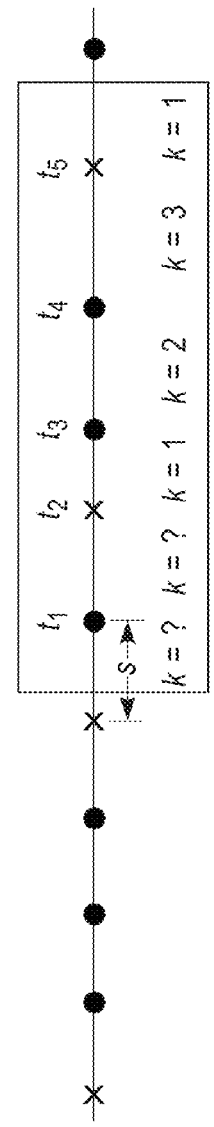
FIG. 7 depicts an exemplary observation window.

Returning to FIG. 2, at step 235, the initial-failure-stage estimation module 120 estimates a time to the first failure (i.e., a time period between an observation window start point to a first failure in the observation window; e.g., a time period s shown in FIG. 7) in the observation window. Suppose that for a given recurrence process, i.e., multiple failures and multiple replacements in an observation window, the maintenance planning system 145 identifies a pattern of failures with and without a replacement as shown in FIG. 7. A likelihood function of the observation window data may be derived from distributions of inter-recurrence intervals. The observation window data refers to a maintenance record of equipment which is collected during an observation window. The likelihood function depends on the distribution of each failure associated with the replacement policy, and on the random number of failures observed in the observation window. The initial-failure-stage estimation module 120 derives the distribution of $t_1$ the time of the first failure in the observation window, e.g., by using equations (22) and (26) below. To derive the distribution of $t_1$, the initial-failure-stage estimation module 120 first obtains expressions for a distribution of indices of recurrent intervals and a length of the inter-recurrence interval that includes a start point of an observation window.

Let S be a random variable representing the length of the inter-recurrence interval in which the observation window start point is included, and suppose that this inter-recurrence interval has an index k, i.e., it is the kth inter-recurrence interval since a replacement of corresponding equipment. In a subset of inter-recurrence intervals with the index k, the interval lengths are independent and identical distribution. Therefore, the pdf of S is given by equation (16):

$$v(s \mid I = k) = \frac{s f_k(s)}{\mu_k}, \quad (16)$$

where $\mu_j$ is as given in equation (15).

Assuming that the observation window start point is included in an inter-recurrence interval of length s, the pdf of $t_1$ is uniform over [0,s], regardless of the value of I: equation (17):

$$g(t_1 \mid S = s, I = k) = \frac{1}{s}, \quad (17)$$

$t_1 \in [0, s]$, for all k.

Thus, equation (18):

$$g(t_1 \mid I = k) = \int_{t_1}^\infty g(t_1 \mid S = s, I = k) v(s \mid I = k) ds = \frac{1 - F_k(t_1)}{\mu_k}. \quad (18)$$

Equations (17)-(18) represent the distribution of the time to the first failure in an observation window.

Returning to FIG. 2, at step 240, the failure and external intervention module 125 models an impact of an external intervention on a failure of the equipment. In one embodiment, to model the impact of the external intervention on the failure of the equipment, the failure and external intervention module 125 calculates the effect of the external intervention, e.g., equation (19):

$$h_k(t) = \gamma \lambda (\lambda t)^{\gamma - 1} \exp\left( \sum_{\alpha=1}^{\xi} \beta_\alpha x_{\alpha, j, k} \right), \quad (19)$$

In equation (19), x is a covariate, representing a characteristic, e.g., length or diameter, and the number of previous failures of the equipment without a replacement of that equipment. β is a coefficient of that covariate. $h_0(t) = \gamma \lambda (\lambda t)^{\gamma - 1}$ is the baseline hazard function with shape parameter γ, λ is a scale parameter and ξ is the number of covariates. A hazard function calculates a failure rate of the equipment for time intervals. Shape parameter is a parameter affecting the shape of a probability distribution. j=1, . . . , M corresponds to a sample path, i.e., recurrences of failures. k=1, . . . , m is an index of an inter-recurrence interval. In one embodiment, the number of covariates is one, i.e., ξ=1. The single covariate $x_{1, \cdot, k}$ is the number of failures of the equipment without a replacement of the equipment. In one embodiment, calculating the equation (19) includes, but is not limited to: calculating a distribution of a time before a replacement of the equipment. The functional time distribution, e.g., a distribution of operation times of the equipment, may be represented based on exponential, Weibull or lognormal distribution. In PH (Proportional Hazard) model based on Weibull distribution, the equation (19) is a hazard function of the kth functional time distribution. The failure and external intervention module 125 also evaluates the effect of the external intervention on the replacement policy, e.g., by solving equation $r_k = p_k / (1 - \Sigma_{j=1}^{k-1} p_j)$.

Steps 225-240 in FIG. 2 are called "Failure-maintenance interaction model" 220. That is, "Failure-maintenance interaction model" 220 includes, but is not limited to: a replacement policy 225; an estimation of the number of preceding failures prior to an observation window 230; an estimation to a time to the first failure in an observation window 235; and modeling an impact of an external intervention on a failure process of equipment 240.

At step 245, the discrepancy measure module 135 measures a discrepancy between the prior maintenance data collected during the observation window and the failure-maintenance interaction model 220. For example, to measure the discrepancy, the maintenance planning system 145 may compare the replacement policy, i.e., a probability of a replacement at a certain number of failures, against actual replacements recorded in the collected prior maintenance data.

Figure 10:
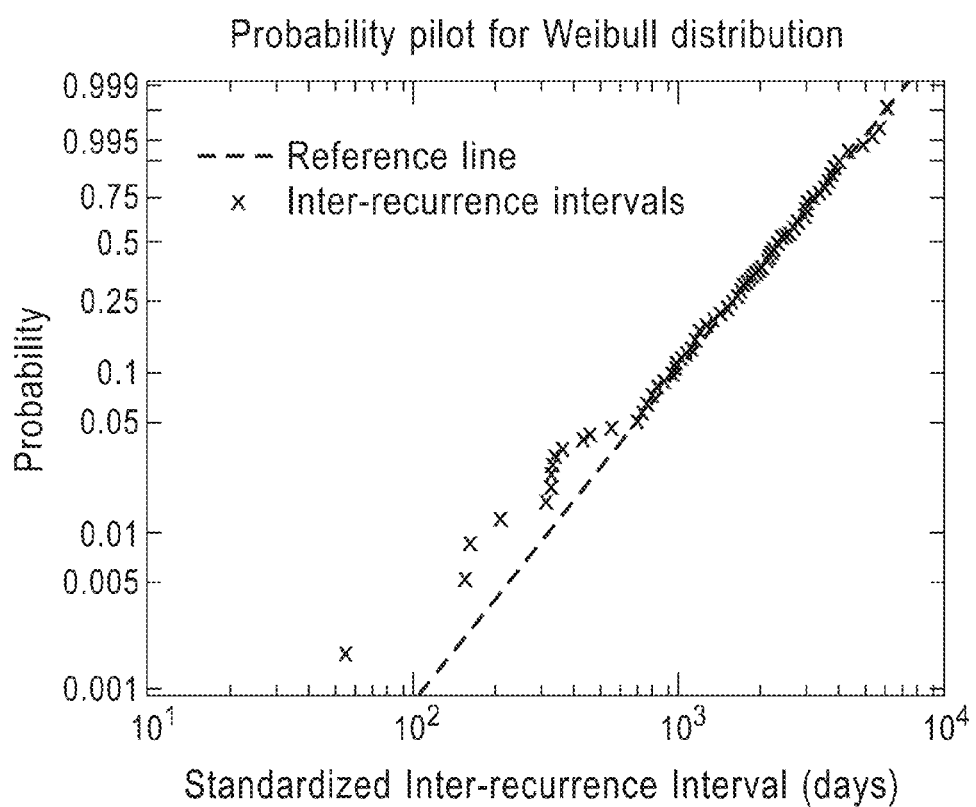
FIG. 10 depicts testing the goodness of fit of the collected maintenance data to the Weibull distribution.

At step 250 in FIG. 2, the maintenance planning system 145 jointly estimates the replacement policy of the equipment and a probability of a subsequent failure of the equipment in a subsequent time period. This estimated replacement policy evaluates the impact of a repair on the equipment. On the other hand, the replacement policy modeled at step 225 evaluates the likelihood of a replacement after each repair. Based on the hazard function given in equation (19), by using Weibull, lognormal or exponential distribution based on a goodness-of-fit test as shown in FIG. 10, the pdf and cdf of the functional time distribution are given by equations (20) and (21):

$$f_k(t) = \gamma\lambda(\lambda t)^{\gamma-1}\exp\left[\sum_{\alpha=1}^{\xi}\beta_\alpha x_{\alpha,j,k} - (\lambda t)^\gamma \exp\left(\sum_{\alpha=1}^{\xi}\beta_\alpha x_{\alpha,j,k}\right)\right], \quad (20)$$

$$F_k(t) = 1 - \exp\left[-(\lambda t)^\gamma \exp\left(\sum_{\alpha=1}^{\xi}\beta_\alpha x_{\alpha,j,k}\right)\right]. \quad (21)$$

, which calculate a probability of a subsequent failure of the equipment in subsequent time periods. FIG. 10 depicts fitting the collected prior maintenance data (e.g., "inter-recurrence intervals") to Weibull distribution ("reference line").

According to equation (18) above, the distribution of the time to the first failure in the observation window is given by equation (22):

$$g(t_1|K=k) = \frac{\exp\left[-(\lambda t_1)^\gamma \exp\left(\sum_{\alpha=1}^{\xi}\beta_\alpha x_{\alpha,j,k}\right)\right]}{\lambda^{-1}\exp\left(-\frac{1}{\gamma}\sum_{\alpha=1}^{\xi}\beta_\alpha x_{\alpha,j,k}\right)\Gamma\left(1+\frac{1}{\gamma}\right)}. \quad (22)$$

For the lognormal AFT (Accelerated Failure Time) model, the location parameter $\tilde{\mu}$ is affected by a repair history. Specifically, the maintenance planning system 145 calculates the following loglinear function to model the effect of covariates:

$$\tilde{\mu}_k = \exp\left(\sum_{\alpha=1}^{\xi}\beta_\alpha x_{\alpha,j,k}\right), \quad (23)$$

where β, x, α, and γ follow the same definitions as in the Weibull model, i.e., table 800 in FIG. 8. Similarly, let λ denote the shape parameter of the lognormal distribution. Thus, the pdf, cdf and distribution of the time to the first failure are given by equations (24)-(26):

$$f_k(t) = \frac{1}{t\sigma\sqrt{2\pi}}\exp\left\{-\frac{1}{2\sigma^2}\left[\ln t - \exp\left(\sum_{\alpha=1}^{\xi}\beta_\alpha x_{\alpha,j,k}\right)\right]^2\right\}, \quad (24)$$

$$F_k(t) = \Phi\left(\frac{1}{\sigma}\left\{\ln t - \exp\left(\sum_{\alpha=1}^{\xi}\beta_\alpha x_{\alpha,j,k}\right)\right\}\right), \quad (25)$$

-continued $$g(t_1|K=k) = \frac{1-\Phi\left(\frac{1}{\sigma}\left\{\ln t - \exp\left(\sum_{\alpha=1}^{\xi}\beta_\alpha x_{\alpha,j,k}\right)\right\}\right)}{\exp\left[\exp\left(\sum_{\alpha=1}^{\xi}\beta_\alpha x_{\alpha,j,k}\right) + \frac{\sigma^2}{2}\right]}. \quad (26)$$

Returning to FIG. 2, at step 255, the maintenance planning system 145 estimates the criticality of a failure or repair or replacement of each equipment. To evaluate the criticality, the maintenance planning system 145 evaluates how many people would be affected if an item of equipment fails, e.g., breaks or becomes out of order.

Figure 3:
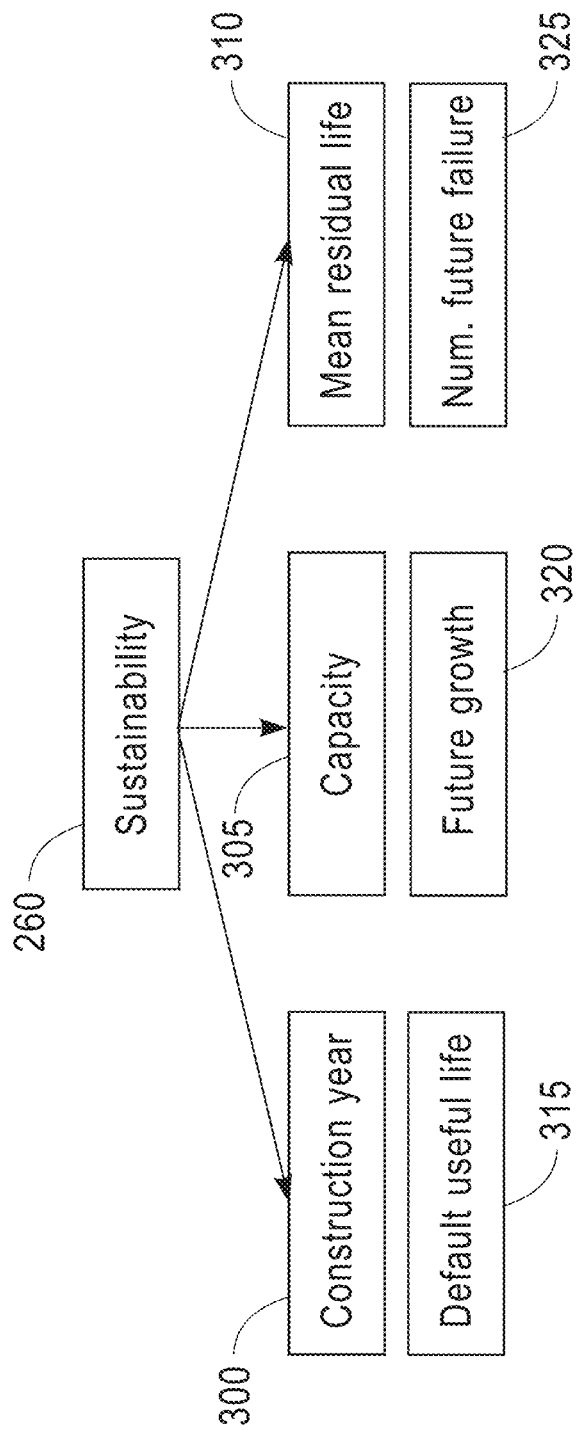
FIG. 3 depicts items to be considered to determine sustainability of equipment in one embodiment.

At step 260, the maintenance planning system 145 estimates sustainability. FIG. 3 depicts that the maintenance planning system 145 evaluates at least six elements to estimate sustainability. The six elements include, but are not limited to: (1) a construction or installation year of equipment 300; (2) capacity of the equipment 305; (3) mean residual life of the equipment 310; (4) default useful life of the equipment 315; (5) a future growth of people who are affected by the equipment 320; (6) the number of possible future failures of the equipment 325. The elements (1)-(4) may be obtained from, e.g., a manufacture of the equipment. The element (5) may be obtained from, e.g., a city hall or annual census data. The element (6) may be obtained from, e.g., equations (20)-(21).

At step 265, the maintenance planning system 145 estimates failure impact of the equipment, e.g., by retrieving, from the database 140, data associated with prior impact of the failure of the equipment from the equipment. For example, the associated data may show which traffic road or subway station was closed when the equipment failed and how long the traffic road or subway station was closed.

At step 270, the maintenance planning and scheduling module 160 establishes a strategic replacement plan, e.g., based on the replacement policy modeled at step 225. For example, the modeled replacement policy indicates 70% possibility of failure in a next year, the maintenance planning system may schedule maintenance of corresponding equipment within a following month. Furthermore, at step 255, the spare part ordering module 155 orders necessary parts to repair or replace the equipment. At step 265, the capital planning module 150 calculates cost of the maintenance, e.g., repair or replacement, of the equipment, e.g., by summing the necessary labor cost and cost of the necessary parts.

Figure 4:
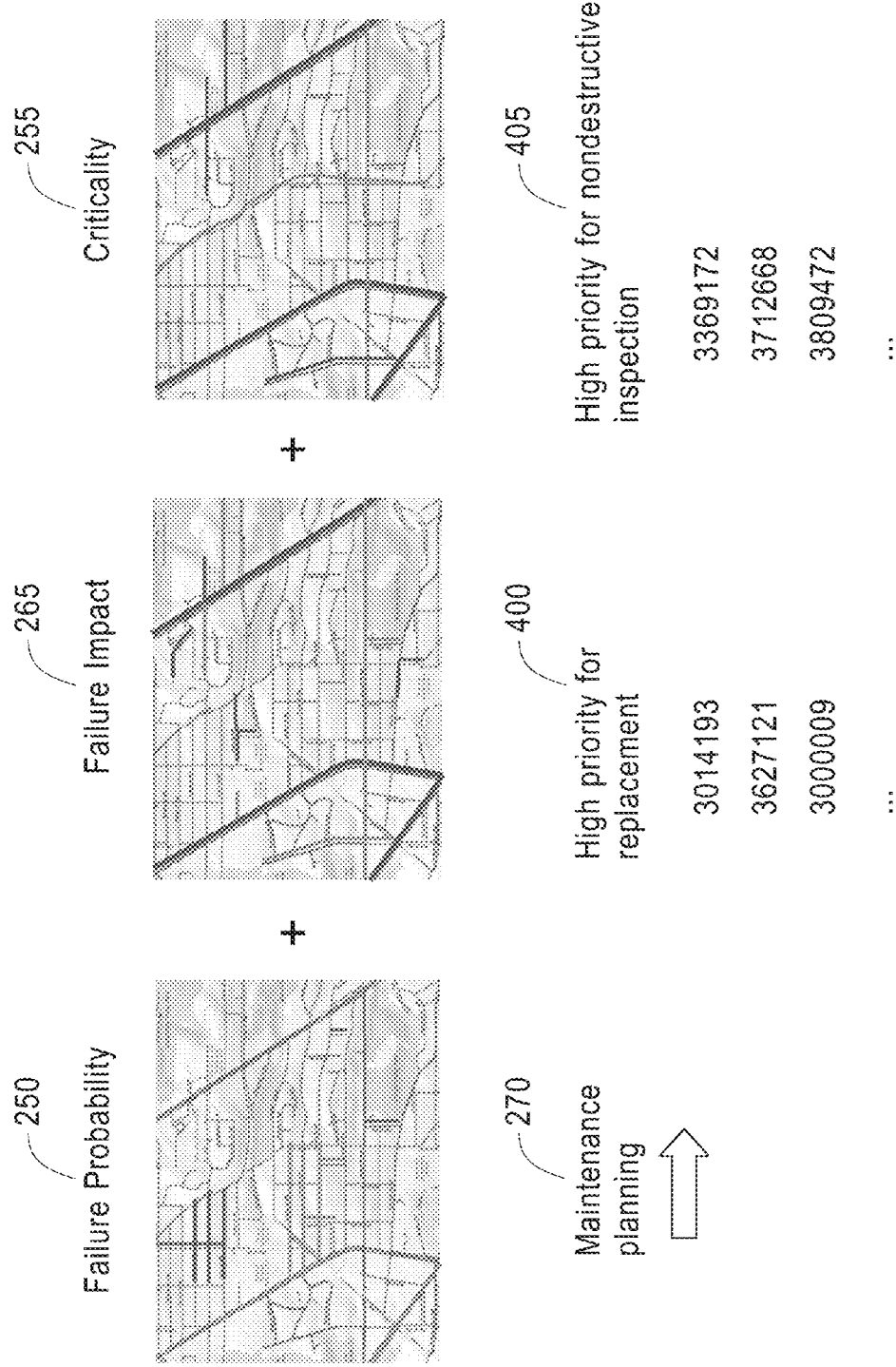
FIG. 4 depicts an exemplary strategic replacement planning.

FIG. 4 depicts an example of the strategic replacement planning based on the outputs at steps 250, 255 and 265, i.e., the probability of a subsequent failure of the equipment in a subsequent time period, the estimated criticality and the estimated failure impact. The exemplary strategic replacement (maintenance) planning 270 takes into account the subsequent failure probability in the next year (planning horizon), failure impact (social impact) and criticality (network structure and system reliability). The exemplary strategic replacement planning 270 includes, but is not limited to: equipment items 400 that are determined as high priority for replacements, and equipment items 405 that are determined as high priority for nondestructive inspections, etc.

Returning to FIG. 1, the optimization module 175 identifies optimal values for the model parameters, e.g., parameters shown in table 800 in FIG. 8, e.g., by maximizing the likelihood function, e.g., equations (5)-(10). The simulation module 180 also can be used to evaluate the likelihood function, e.g., by using Markov Chain Monte Carlo simulation (http://en.wikipedia.org/wiki/Markov_chain_Monte_Carlo). The likelihood functions, e.g., equations (5)-(10), allows for modeling both non-identical inter-recurrence intervals and effects of a covariate(s). Equation (19) and the replacement policy, e.g., $r_k = p_k/(1-\Sigma_{j=1}^{k-1} p_j)$, calculate a distribution for modeling the effect of external interventions on recurrence processes, i.e., recurrent failures of equipment. This distribution represents that the number of failures observed prior to a replacement tends to increase with the number of external interventions.

In one embodiment, the maintenance planning system 145 calculates a failure-maintenance model 220 per one item of equipment. The maintenance planning system 145 solves equations (20)-(21) per one item of equipment in order to calculate a probability of a subsequent failure of that item of equipment in a subsequent time period. In another embodiment, the maintenance planning system 145 calculates a failure-maintenance model 220 per one component in one item of equipment. The maintenance planning system 145 solves equations (20)-(21) per one component in one item of equipment in order to calculate a probability of a subsequent failure of that component in the one item of the equipment in a subsequent time period.

In one embodiment, the data pre-processor 105, the statistical modeler 110, the decision-making modeler 165, and the computing modeler 170 are implemented on hardware or reconfigurable hardware, e.g., FPGA (Field Programmable Gate Array) or CPLD (Complex Programmable Logic Device), by using a hardware description language (Verilog, VHDL, Handel-C, or System C). In another embodiment, the data pre-processor 105, the statistical modeler 110, the decision-making modeler 165, and the computing modeler 170 are implemented on a semiconductor chip, e.g., ASIC (Application-Specific Integrated Circuit), by using a semi-custom design methodology, i.e., designing a chip using standard cells and a hardware description language.

In another embodiment, the data pre-processor 105, the statistical modeler 110, the decision-making modeler 165, and the computing modeler 170 are implemented as software, e.g., by using software programming languages, for example, C, C++, Java®, .NET. In another embodiment, the data pre-processor 105, the statistical modeler 110, the decision-making modeler 165, and the computing modeler 170 are implemented by a computing system, e.g., mainframe, a server device, a desktop computer, a laptop computer, a netbook computer, a tablet computer, etc., that includes at least one processor and at least one memory device connected to the processor.

In one embodiment, the system 100 shown in FIG. 1 provides benefits as follows:

(1) Estimating initial conditions of public facilities prior to the observation window—this estimated initial conditions are used to model a probability of a replacement of equipment at a subsequent failure and a probability of a subsequent failure of the equipment in a subsequent time period;

(2) Leveraging information of external interventions for failure risk prediction;

(3) Utilizing information from all observation windows, including those in which there is no failure or in which prior failures are left censored, i.e., prior failures exist before or prior to a starting time of an observation window;

(4) Introducing covariates, in mathematical models, which represent infrastructure properties, environmental and operating conditions;

(5) Improving the accuracy of failure predictions and the reliability of decisions for maintenance planning based on window limited failure-maintenance data, e.g., the observation window, and failure-maintenance interaction model, e.g., equation (19) and $r_k = p_k/(1-\Sigma_{j=1}^{k-1} p_j)$.

(6) Not relying on Poisson assumption that implies a constant occurrence of failures over time.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for predicting a failure of equipment from prior maintenance data of the equipment collected during a time duration, the method comprising:
   estimating a number of preceding failures of the equipment prior to the time duration;
   modeling, based on the prior maintenance data, an impact of an intervention on a failure of the equipment; and
   modeling, based on the modeled impact of the intervention and the estimated number of preceding failures, a replacement policy of the equipment and a probability of a subsequent failure of the equipment in a subsequent time period, the modeling the replacement policy including:
      calculating a first probability that when the equipment is replaced, the equipment has experienced exactly k number of interventions, wherein the k is a positive integer number; and
      calculating a second probability that the equipment needs to be replaced at a kth failure,
   wherein a computing system, which includes a processor and a memory device, performs the estimating, the modeling the impact, and the modeling the replacement policy and the probability of the subsequent failure.

2. The computer-implemented method according to claim 1, wherein the estimating the number of the preceding failures of the equipment includes:
   deriving a distribution of a time to a first failure in the time duration; and
   deriving a distribution of a time between two consecutive failures of the equipment.

3. The computer-implemented method according to claim 1, wherein the modeling the impact includes:
   calculating an efficiency of the intervention.

4. The computer-implemented method according to claim 3, wherein the calculating the efficiency of the intervention includes a step of:
   calculating a distribution of a time before a replacement of the equipment.

5. The computer-implemented method according to claim 1, further comprising:
   calculating a probability that no failure of the equipment occurs during the time duration, a probability that exactly one failure of the equipment but no replacement of the equipment occurs during the time duration, a probability that there is only one failure of the equipment followed by a replacement of the equipment, a probability that there are multiple failures and replacements of the equipment.

6. The computer-implemented method according to claim 1, further comprising:
   measuring a discrepancy between the observed data and the modeled replacement policy and subsequent failure probability.

7. The computer-implemented method according to claim 1, wherein the calculating the first and second probabilities includes a step of:
   performing a maximum likelihood estimation, penalized maximum likelihood estimation, EM (Expectation and Maximization) algorithm or simulation on the data collected during the time duration.

8. The computer-implemented method according to claim 7, wherein the collected data comes from a plurality of resources, each resource having prior maintenance data collected during each different time duration.

9. The computer-implemented method according to claim 1, wherein the intervention includes one or more of: an inspection of the equipment, a repair of the equipment, and a replacement of the equipment.

10. The computer-implemented method according to claim 1, wherein the replacement policy includes steps of:
    scheduling an intervention at the equipment;
    ordering necessary parts to replace the equipment; and
    calculating cost of the intervention.

11. A computer program product for predicting a failure of equipment from prior maintenance data of the equipment collected during a time duration, the computer program product comprising a non-transitory storage medium readable by a processing circuit and storing instructions run by the processing circuit for performing a method, said method steps comprising:

estimating a number of preceding failures of the equipment prior to the time duration;

modeling, based on the prior maintenance data, an impact of an intervention on a failure of the equipment; and modeling, based on the modeled impact of the intervention and the estimated number of preceding failures, a replacement policy of the equipment and a probability of a subsequent failure of the equipment in a subsequent time period, modeling the replacement policy including:

calculating a first probability that when the equipment is replaced, the equipment has experienced exactly k number of interventions, wherein the k is a positive integer number; and calculating a second probability that the equipment needs to be replaced at a kth failure.

12. The computer program product according to claim 11, wherein the estimating the number of failures of the equipment includes:

deriving a distribution of a time to a first failure in the time duration; and deriving a distribution of a time between two consecutive failures of the equipment.

13. The computer program product according to claim 11, wherein the modeling the impact includes:

calculating an efficiency of the intervention.

14. The computer program product according to claim 13, wherein the calculating the efficiency of the intervention includes a step of:

calculating a distribution of a time before a replacement of the equipment.

15. The computer program product according to claim 11, further comprising:

calculating a probability that no failure of the equipment occurs during the time duration, a probability that exactly one failure of the equipment but no replacement of the equipment occurs during the time duration, a probability that there is only one failure of the equipment followed by a replacement of the equipment, a probability that there are multiple failures and replacements of the equipment.

16. The computer program product according to claim 11, further comprising:

measuring a discrepancy between the observed data and the modeled replacement policy and subsequent failure probability.

17. The computer program product according to claim 11, wherein the calculating the first and second probabilities includes a step of:

performing a maximum likelihood estimation, penalized maximum likelihood estimation, EM (Expectation and Maximization) algorithm or simulation on the data collected during the time duration.

18. The computer program product according to claim 17, wherein the collected data comes from a plurality of resources, each resource having prior maintenance data collected during each different time duration.

19. The computer program product according to claim 11, wherein the intervention includes one or more of: an inspection of the equipment, a repair of the equipment, and a replacement of the equipment.

20. The computer program product according to claim 11, wherein the replacement policy includes steps of:

scheduling an intervention at the equipment;

ordering necessary parts to replace the equipment; and calculating cost of the intervention.

* * * * *